United States Patent [19]

Agarwal

[11] 4,201,859

[45] May 6, 1980

[54] RANDOM COPOLYESTER ADHESIVE RESINS

[75] Inventor: Maya Agarwal, Mogadore, Ohio

[73] Assignee: The Goodyear Tire & Rubber Company, Akron, Ohio

[21] Appl. No.: 23,871

[22] Filed: Mar. 26, 1979

[51] Int. Cl.$^2$ ............................................. C08L 63/18
[52] U.S. Cl. .................................... 528/302; 528/308; 528/309
[58] Field of Search ..................... 528/302, 308, 309

[56] References Cited

U.S. PATENT DOCUMENTS

| | | | |
|---|---|---|---|
| 3,423,281 | 1/1969 | Wiener | 528/302 X |
| 3,682,863 | 8/1972 | McHale | 528/302 |
| 4,065,439 | 12/1977 | Uno et al. | 528/302 |
| 4,072,662 | 2/1978 | Van der Linde et al. | 528/302 |

Primary Examiner—Lucille M. Phynes
Attorney, Agent, or Firm—J. P. Ward

[57] ABSTRACT

The present invention provides as compositions of matter, linear random copolyester resins having intrinsic viscosities ranging from 0.5 to 1.0 deciliters per gram, said copolyester resins being the polymeric reaction products of a mixture of reactants consisting of ethylene glycol, terephthalic acid or a lower $C_1$–$C_4$ dialkyl ester thereof, phthalic acid or phthalic anhydride, and an aliphatic dicarboxylic acid or lower $C_1$–$C_4$ dialkyl ester thereof and said copolyester resins having utility as solution adhesives.

6 Claims, No Drawings

RANDOM COPOLYESTER ADHESIVE RESINS

TECHNICAL FIELD

This invention relates to novel random copolyester resins. The invention particularly relates to random copolyester resins and their use as solution adhesives. More particularly the invention relates to random copolyester adhesives which possess a high degree of solubility in most common solvents and which do not precipitate from solution on standing.

BACKGROUND ART

Random copolyesters derived from ethylene glycol, terephthalic acid, isophthalic acid and azelaic acid have obtained commercial acceptance as solution adhesives in a variety of applications for the bonding together of various materials. However, because of the nature of these copolyesters they have not been found acceptable for use in applications such as magnetic tapes and solar screening film where audio quality and optical clarity are of utmost importance respectively. In addition these copolyesters exhibit only limited solubility in the more commonly used organic solvents and give hazy solutions when the concentration of these copolyesters in solvent exceeds about 30 parts by weight of the copolyester per 100 parts by weight of combined copolyester and solvent.

It is an object of this invention to provide random copolyester resins which are suitable for use in solution adhesive applications. It is a further object of this invention to provide random copolyester resins which possess improved solubility and exhibit clear solutions for extended periods of time when dissolved in organic solvents at concentrations exceeding 30 parts by weight of the copolyester per 100 parts by weight of the copolyester and solvent combined. Other objects of the invention will become apparent as the description of the invention herein proceeds.

DISCLOSURE OF THE INVENTION

The present invention provides random copolyesters derived from ethylene glycol, terephthalic acid or the lower $C_1-C_4$ dialkyl esters thereof, phthalic acid or the anhydride thereof and aliphatic dicarboxylic acids selected from the group consisting of unsubstituted and lower alkyl substituted aliphatic dicarboxylic acids containing from 5 to 12 carbon atoms in the linear chain or the lower $C_1-C_4$ dialkyl esters thereof, which copolyesters possess improved solubility and give clear solutions when dissolved in various organic solvents. The random copolyesters of this invention are further characterized by the specific proportions in which the individual acid constituents or the reactive equivalents thereof are employed in preparing said copolyesters and which proportions are herein expressed in terms of the number of mols of each individual acid constituent or reactive equivalent thereof to the total number of mols of all acid constituents or reactive equivalents thereof. Thus for the random copolyesters described herein the ranges for the mol percent of the individual acid constituents or their reactive equivalents to the total mols of all acid constituents or reactive equivalents thereof are as follows:

| Terephthalate units | 5 to 55 mol percent |
| --- | --- |
| Phthalate units | 5 to 40 mol percent |
| Aliphatic dicarboxylate units | 5 to 65 mol percent |

The above represents the broadest ranges for the individual constituents. A more preferred set of ranges is:

| Terephthalate units | 5 to 30 mol percent |
| --- | --- |
| Phthalate units | 5 to 40 mol percent |
| Aliphatic dicarboxylate units | 5 to 50 mol percent |

As used herein "terephthalate units" shall mean the radical remaining after removal of the hydrogen atoms from terephthalic acid or alkyl groups from a lower $C_1-C_4$ dialkyl ester of terephthalic acid, "phthalate units" shall mean the radical remaining after removal of the hydrogen atoms of the phthalic acid or the opening of the heterocyclic ring of phthalic anhhdride and "aliphatic dicarboxylate units" shall mean the radical remaining after the removal of hydrogen atoms from an aliphatic dicarboxylic acid or alkyl groups from a lower $C_1-C_4$ dialkyl ester of an aliphatic dicarboxylic acid.

BEST MODE FOR CARRYING OUT THE INVENTION

The copolyesters of the present invention can be prepared by either an esterification or transesterification reaction followed by a subsequent polycondensation of the esterification or transesterification reaction products, methods well known in the art. The esterification or transesterification reactions are generally carried out at elevated temperatures under an atmosphere of inert gas such as nitrogen using catalysts such as soluble lead and titanium catalysts, examples of which include lead acetate, litharge and glycol titanates. Additional catalysts which are well known to promote these reactions include zinc, magnesium, calcium and manganese containing materials. However, the soluble lead and titanium containing catalysts are usually preferred since they will also promote the formation of highly polymeric copolyesters in reasonable reaction times.

The condensation reaction is also generally carried out in accordance with the usual known techniques. Thus the reactions are preferably carried out in the absence of oxygen, generally in an atmosphere of inert gas such as nitrogen under reduced pressure ranging from about 10 millimeters of mercury pressure to about 0.5 millimeter of mercury pressure or lower. In addition, temperatures employed in the condensation reaction will range from about 225° to 280° C. and preferably in the range from about 240° C. to 270° C.

The preparation of certain of the random copolyesters described herein is set forth in the examples immediately below.

EXAMPLE 1

Two hundred and thirty three grams (233.0 gms) of dimethyl terephthalate (DMT), 297.6 gms of ethylene glycol and 5.0 milliliters (ml) of an ethylene glycol titanate catalyst solution (60 parts per million of titanium based on DMT) where charged into a glass reactor equipped with a nitrogen inlet and condenser and under a nitrogen atmosphere, heated at 180° C. until the transesterification reaction was complete. The temperature of the resultant product was then raised to 200° C., 118.4 gms of phthalic anhydride added to the reactor and the reaction continued for another 15 minutes. Then 376.4 gms of azelaic acid were added to the reactor, the temperature of the reaction mixture increased to 230° C. and the reaction continued until the theoretical amount of by-product water had been distilled off. At the end of this time polycondensation of the reaction mixture was begun by slowly increasing the temperature of reaction from 250° C. to 270° C. while slowly reducing the pressure in the reactor to about 0.3 mm of mercury pressure. At the end of three hours following commencement of the polycondensation step the reaction was complete. The mol percent of terephthalate/phthalate/azelate units for this random copolyester was 30/20/50 as charged and the copolyester possessed an intrinsic viscosity (IV) of 0.86 deciliters per gram (dl/gm) as measured in a 60/40 phenol/tetrachloroethane mixed solvent system at 30° C. This copolyester formed clear solutions in methyl ethyl ketone solvent in concentrations up to 60 parts by weight per 100 parts by weight of the copolyester and solvent combined. These solutions remained clear during the 12 month period they were retained for observation.

EXAMPLE 2

A second random copolyester was prepared employing techniques similar to those used in Example 1. In this Example 23.3 gms of DMT, 29.8 gms of ethylene glycol and 0.4 ml of the ethylene glycol titanate catalyst solution (60 parts per million of titanium based on DMT) were added to the glass reaction vessel and, under nitrogen atmosphere, the mixture was heated to between 180° C. to 200° C. When the reaction was complete 17.8 gms of phthalic anhydride were added to the reactor and the reaction continued for an additional 15 minutes. Then 30.1 gms of azelaic acid were added to the reaction mixture, the temperature of the mixture raised to 230° C. and the reaction continued until the theoretical amount of by-product water had been collected. The pressure in the reactor was then slowly reduced to 0.30 mm of mercury pressure and the temperature slowly increased to 270° C. The desired IV of 0.73 as measured in a 60/40 phenol/tetrachloroethane mixed solvent at 30° C. was obtained within two hours after the above final polycondensation conditions of pressure and temperature had been reached.

The mol percent of terephthalate/phthalate/azelate units for the copolyester prepared in this Example 2 was 30/30/40 as charged. This copolyester also formed clear solutions in methyl ethyl ketone solvent in concentrations up to 60 parts per weight per 100 parts by weight of the copolyester and solvent combined. These solutions remained clear during the 12 month period they were retained for observation.

EXAMPLES 3–7

A series of copolyesters were prepared to demonstrate the improved solubility of certain of the copolyesters of this invention in non-polar solvents such as methyl ethyl ketone as compared to a commercially available copolyester used in solution adhesive applications and derived from ethylene glycol, terephthalic acid or its dimethyl ester, isophthalic acid and azelaic acid. The compositions of the various copolyesters, their intrinsic viscosities and densities and visual appearance in methyl ethyl ketone solvent are given in Table I below. The copolyesters were all prepared using the same techniques as described in Examples 1 and 2 above.

TABLE 1

| Example | Acid Unit Composition Mol % as Charged T/P/Az(a) | IV dl/gm | Density gm/ml | Appearance 45%(b) |
|---|---|---|---|---|
| 3 | 30/20/50 | 0.89 | 1.220 | Clear |
| 4 | 30/30/40 | 0.88 | 1.250 | Clear |
| 5 | 25/35/40 | 0.72 | 1.242 | Clear |
| 6 | 30/15/55 | 0.44 | 1.255 | Clear |
| 7 | 30/35/35 | 0.50 | 1.251 | Clear |
| Control(c) | 30/20/50 | 0.85 | 1.221 | Hazy |

(a)T = terephthalate units P = phthalate units $A_z$ = azelate units
(b)Parts by weight of copolyester per 100 parts of copolymer and methyl ethyl ketone combined expressed as a percentage
(c)The control sample was comprised of the following structural units: terephthalate units, isophthalate units and azelate units.

EXAMPLES 8–9

Two adhesive solutions comprised of copolyester compositions identical to the copolyester compositions of Examples 3 and 4 above and methyl ethyl ketone were prepared and stored for up to 12 months to determine their solution stability or shelf life. These solutions contained 45 parts by weight of copolyester per 100 parts by weight of copolyester and solvent combined. The samples were stored at room temperature. Table II below lists all pertinent data and observations. These copolyesters exhibited excellent solution stability.

TABLE II

| | Acid Unit Composition Mol % as Charged | IV | Appearance in MEK (45%)(b) | | |
|---|---|---|---|---|---|
| Example | T/P/Az(a) | dl/gm | Initial | 18 Weeks | 12 Months |
| 8 | 30/20/50 | 0.89 | Clear | Clear | Clear |
| 9 | 30/30/40 | 0.88 | Clear | Clear | Clear |
| Control(c) | 30/20/50 | 0.85 | Sl. Hazy | Hazy | Hazy |

(a)Same as footnoted in Table I above
(b)Same as footnoted in Table I above
(c)Same as footnoted in Table I above

EXAMPLES 10–17

A further series of copolyesters representative of the copolyesters of this invention was prepared using the techniques as described in Examples 1 and 2. These copolyesters exhibited excellent solubility and stability in polar solvents such as tetrahydrofuran (THF). Typical properties such as IV, carboxyl content (COOH) and density are given in Table III below.

TABLE III

| Example | Acid Units Mol %, as Charged T/P/Az(a) | dl/gm | COOH eq/$10^6$ gm of Polymer(b) | Density gm/ml |
|---|---|---|---|---|
| 10 | 35/25/40 | 0.68 | 16 | 1.200 |
| 11 | 45/15/40 | 0.62 | 13 | 1.218 |
| 12 | 50/10/40 | 0.67 | 16 | 1.285 |
| 13 | 55/5/40 | 0.45 | | 1.287 |
| 14 | 45/20/35 | 0.64 | 16 | |
| 15 | 40/30/30 | 0.50 | 10 | 1.271 |
| 16 | 40/40/20 | 0.47 | 26 | 1.285 |
| 17 | 35/30/35 | 0.58 | 14 | 1.252 |

(a)T = terephthalate units P = phthalate units AZ = azelate units
(b)eq/$10^6$ gm is the abbreviation for equivalents per million grams of polyester.

The above examples illustrate the preparation, physical properties and solubility and stability in various solvents of a number of copolyesters representative of the random copolyesters of the present invention. They were derived from the transesterification and subsequent polycondensation of various mixtures of alkylene glycol, dimethyl terephthalate, phthalic anhydride and azelaic acid. However, these copolyesters are also capable of being prepared starting with terephthalic acid and phthalic acid in place of the respective dimethyl ester and acid anhydride. In addition, aliphatic dicarboxylic acids other than azelaic acid and $C_1$-$C_4$ dialkyl esters thereof can be employed, including for example glutaric acid, adipic acid, pimelic acid, suberic acid, sebacic acid, dodecanedioic acid and alkyl substituted aliphatic dicarboxylic acids such as 2,2'-dimethyl sebacic acid, 2,5-dimethyl adipic acid, 2-methyl sebacic acid and the like and esters such as diisobutyl adipate, dimethyl sebacate, dibutyl sebacate and the like.

The copolyesters of this invention are high molecular weight materials. Thus these copolyesters will have intrinsic viscosities ranging from about 0.5 to 1.0 deciliters per gram as measured in a 60/40 phenol/tetrachloroethane mixed solvent system at 30° C. The copolyesters of this invention are also amorphous and have densities ranging from about 1.15 to 1.33 grams per milliliter.

The solubility of these copolyesters has been demonstrated in such solvents as tetrahydrofuran and methyl ethyl ketone. Additional organic solvents in which these copolyesters have been found to be soluble include toluene, acetone, methyl propyl ketone, cyclohexanone, ethyl acetate, methyl cellosolve acetate, cellosolve acetate, methylene chloride, ethylene dichloride, trichloroethylene and the like.

Although the copolyesters of the invention exhibit solubility in the above listed solvents certain guidelines must be adhered to particularly when adhesive solutions are prepared employing non-polar or slightly polar solvents such as methyl ethyl ketone in which concentrations of the copolyester in the solvent in the range of 45 to 60 percent by weight are desired. In such instance it has been found that the copolyester employed in preparing the adhesive solution should not contain terephthalate units in an amount exceeding about 30 mol percent based on the total mols of acid units. Solubility studies conducted on polyesters of this invention containing more than 30 mol percent of terephthalate units have shown a tendency to form gel in non-polar and slightly polar solvents. On the other hand copolyesters containing up to 55 mol percent of terephthalate units are completely soluble in polar solvents such as tetrahydrofuran and dioxane at concentrations as high as 60 percent by weight. Based on these findings and teachings those of ordinary skill in this art can readily determine the degree of solubility of a particular copolyester composition in any given organic solvent medium.

INDUSTRIAL APPLICABILITY

The copolyesters herein described have properties which make them highly desirable for use as adhesives. The copolyesters have low glass transition temperatures, are essentially amorphous and exhibit a very high degree of solubility in various solvents and excellent solution stability or shelf life over extended periods of time. Due to these qualities the copolyesters of the invention can be used in a multitude of applications. Thus the copolyesters find ready applicability as adhesives for "Mylar" film, aluminum foil, metal, leather, vinyl film and the like and as coatings for rigid wire. They are particularly suited for use as binders for iron oxide in magnetic tape applications and as adhesives for solar screening film where audio quality and optical clarity respectively are of primary consideration.

The copolyester resins are generally used without further compounding but they can be compounded or physically blended with other materials. Thus resins, elastomers, pigments, dyes and other ingredients can be mixed or blended with the copolyesters and used in various applications.

While certain representative embodiments and details have been shown for the purpose of illustrating the invention it will be apparent to those skilled in this art that various changes and modifications may be made therein without departing from the spirit or scope of the invention.

I claim:

1. As a composition of matter a linear random copolyester having an intrinsic viscosity ranging from 0.5 to 1.0 deciliters per gram as determined in a 60/40 by volume mixed solvent system of phenol and tetrachloroethane at 30° C. and suitable for use as a solution adhesive, said copolyester being the polymeric reaction product of a mixture of reactants consisting of
   (a) ethylene glycol
   (b) terephthalic acid or a lower $C_1$-$C_4$ dialkyl ester thereof
   (c) phthalic acid or phthalic anhydride
   (d) an aliphatic dicarboxylic acid selected from the group consisting of unsubstituted and lower alkyl substituted aliphatic dicarboxylic acids containing from 5 to 12 carbon atoms in the linear chain or lower $C_1$-$C_4$ dialkyl ester thereof
in which mixture the amount of terephthalic acid or lower $C_1$-$C_4$ dialkyl ester thereof ranges from 5 to 55 mol percent, the amount of phthalic acid or phthalic anhydride ranges from 5 to 40 mol percent and the amount of aliphatic dicarboxylic acid or lower $C_1$-$C_4$ dialkyl ester thereof ranges from 5 to 65 mol percent, all percentages being based on the total mols of the acid constituents or reactive equivalents thereof in said mixture.

2. The composition of claim 1 wherein said copolyester is the polymeric reaction product of a mixture of reactants consisting of
   (a) ethylene glycol
   (b) terephthalic acid or a lower $C_1$-$C_4$ dialkyl ester thereof
   (c) phthalic acid or phthalic anhydride
   (d) an aliphatic dicarboxylic acid selected from the group consisting of unsubstituted and lower alkyl substituted aliphatic dicarboxylic
   acids containing from 5 to 12 carbon atoms in the linear chain or lower $C_1$-$C_4$ dialkyl ester thereof
in which mixture the amount of terephthalic acid or lower $C_1$-$C_4$ dialkyl ester thereof ranges from 5 to 30 mol percent, the amount of phthalic acid or phthalic anhydride ranges from 5 to 40 mol percent and the amount of aliphatic dicarboxylic acid or lower $C_1$-$C_4$ dialkyl ester thereof ranges from 5 to 50 mol percent, all percentages based on the total mols of the acid constituents or reactive equivalents thereof in said mixture.

3. The composition of claim 2 wherein said copolyester is the polymeric reaction produce of a mixture of reactants consisting of ethylene glycol, terephthalic acid, phthalic anhydride and azelaic acid.

4. The composition of claim 3 wherein said copolyester has an intrinsic viscosity ranging from 0.5 to 1.0 deciliters per gram as determined in a 60/40 by volume mixed solvent system of phenol and tetrachloroethane at 30° C., a density ranging from 1.15 to 1.33 grams per milliliter, said copolyester being soluble in non-polar solvents in amounts up to about 60 parts by weight per 100 parts by weight of the copolyester and solvent combined.

5. The composition of claim 2 wherein said copolyester is the polymeric reaction product of a mixture of reactants consisting of ethylene glycol, dimethyl terephthalate, phthalic anhydride and azelaic acid.

6. The composition of claim 5 wherein said copolyester has an intrinsic viscosity ranging from 0.5 to 1.0 deciliters per gram as determined in a 60/40 by volume mixed solvent system of phenol and tetrachloroethane at 30° C., a density ranging from 1.15 to 1.33 grams per milliliter, said copolyester being soluble in non-polar solvents in amounts up to about 60 parts by weight per 100 parts by weight of the copolyester and solvent combined.

* * * * *